US008813207B2

(12) United States Patent
Ota et al.

(10) Patent No.: US 8,813,207 B2
(45) Date of Patent: Aug. 19, 2014

(54) IMAGE GENERATING APPARATUS, PROJECTOR, AND METHOD FOR GENERATING AN IMAGE

(75) Inventors: Koichiro Ota, Omachi (JP); Kazuma Iri, Hutyu (JP)

(73) Assignee: Seiko Epson Corporation, Tokyo (JP)

(*) Notice: Subject to any disclaimer, the term of this patent is extended or adjusted under 35 U.S.C. 154(b) by 143 days.

(21) Appl. No.: 13/413,864

(22) Filed: Mar. 7, 2012

(65) Prior Publication Data
US 2012/0233680 A1 Sep. 13, 2012

(30) Foreign Application Priority Data

Mar. 10, 2011 (JP) ................................. 2011-052792

(51) Int. Cl.
| | | |
|---|---|---|
| H04L 29/06 | (2006.01) | |
| G09C 5/00 | (2006.01) | |
| H04N 21/41 | (2011.01) | |
| H04L 9/32 | (2006.01) | |
| H04N 21/835 | (2011.01) | |

(52) U.S. Cl.
CPC .............. *H04L 63/0823* (2013.01); *G09C 5/00* (2013.01); *H04N 21/4122* (2013.01); *H04L 9/3263* (2013.01); *H04N 21/835* (2013.01)
USPC .................................. 726/10; 726/7; 713/156

(58) Field of Classification Search
USPC ........ 726/2–10; 340/5.81; 713/150, 155–157, 713/176–178
See application file for complete search history.

(56) References Cited

U.S. PATENT DOCUMENTS

| | | | | |
|---|---|---|---|---|
| 6,330,549 | B1* | 12/2001 | Merkle ........................... | 705/51 |
| 6,393,126 | B1* | 5/2002 | van der Kaay et al. ....... | 380/241 |
| 6,948,069 | B1* | 9/2005 | Teppler ......................... | 713/178 |
| 7,000,114 | B1* | 2/2006 | Hasebe et al. ................ | 713/176 |
| 7,260,556 | B2* | 8/2007 | Stefik ............................. | 705/52 |
| 8,321,791 | B2* | 11/2012 | Dixon et al. .................. | 715/738 |
| 8,412,806 | B2* | 4/2013 | Schneider .................... | 709/221 |
| 2005/0149852 | A1* | 7/2005 | Bleicher et al. ............ | 715/501.1 |
| 2009/0083372 | A1* | 3/2009 | Teppler ......................... | 709/203 |

FOREIGN PATENT DOCUMENTS

| | | | |
|---|---|---|---|
| JP | 2005-262817 A | | 9/2005 |
| JP | 2005262817 A | * | 9/2005 |

\* cited by examiner

*Primary Examiner* — Darren B Schwartz
*Assistant Examiner* — John B King
(74) *Attorney, Agent, or Firm* — ALG Intellectual Property, LLC

(57) ABSTRACT

An image generating apparatus includes a timepiece determining section determining whether or not the setting of an internal clock is normal, a certificate determining section determining whether or not a received electronic certificate from a communication target apparatus is valid based on the setting of the internal clock, a communication section performing communication for authentication with the communication target apparatus if the certificate determining section determines that the received electronic certificate is valid and receiving image information from an image supplying apparatus belonging to a network to which the communication target apparatus belongs or the communication target apparatus, a control section making the communication section perform communication for authentication irrespective of whether or not the received electronic certificate is valid if the timepiece determining section determines that the setting of the internal clock is not normal, and an image generating section generating an image based on the image information.

17 Claims, 5 Drawing Sheets

IMAGE GENERATING APPARATUS, PROJECTOR, AND METHOD FOR GENERATING AN IMAGE

The entire disclosure of Japanese Patent Application No. 2011-052792 filed Mar. 10, 2011 is expressly incorporated by reference herein.

BACKGROUND

1. Technical Field

The present invention relates to image generating apparatuses, projectors, and methods for generating an image.

2. Related Art

In general, projectors, printers, and the like do not have the function of displaying a date and time. Therefore, the projectors and the like need to set a date and time if verifying a certificate which is necessary for processing such as EAP (extensible authentication protocol). For example, JP-A-2005-262817 describes a method (method 1) by which a time within the period of validity of a previously stored electronic certificate is set as a reference time, time information is received from a server and is set as a reference time again, and communication with the server is performed by using the validity period information of the electronic certificate and the reference time and a method (method 2) by which time information is received from the server and is set as a reference time, an electronic certificate with validity period information containing a reference time is selected, and communication with the server is performed by using the validity period information of the electronic certificate and the reference time.

However, since neither method 1 nor method 2 determines the validity of an electronic certificate itself, method 1 or method 2 cannot be used for authentication of EAP or the like.

SUMMARY

An advantage of some aspects of the invention is to provide an image generating apparatus, a projector, and a method for generating an image, the apparatus, the projector, and the method that can appropriately make an authentication determination if an image is generated by performing authentication using an internal clock and an electronic certificate even if the setting of the internal clock is not normal by solving the problems described above.

An image generating apparatus according to one aspect of the invention includes: a timepiece determining section that determines whether or not the setting of an internal clock is normal; a certificate determining section that determines whether or not a received electronic certificate from a communication target apparatus is valid based on the setting of the internal clock; a communication section that performs communication for authentication with the communication target apparatus if the certificate determining section determines that the received electronic certificate is valid, and receives image information from an image supplying apparatus belonging to a network to which the communication target apparatus belongs or the communication target apparatus; a control section that makes the communication section perform communication for authentication irrespective of whether or not the received electronic certificate is valid if the timepiece determining section determines that the setting of the internal clock is not normal; and an image generating section that generates an image based on the image information.

A projector according to one aspect of the invention includes: a timepiece determining section that determines whether or not the setting of an internal clock is normal; a certificate determining section that determines whether or not a received electronic certificate from a communication target apparatus is valid based on the setting of the internal clock; a communication section that performs communication for authentication with the communication target apparatus if the certificate determining section determines that the received electronic certificate is valid, and receives image information from an image supplying apparatus belonging to a network to which the communication target apparatus belongs or the communication target apparatus; a control section that makes the communication section perform communication for authentication irrespective of whether or not the received electronic certificate is valid if the timepiece determining section determines that the setting of the internal clock is not normal; an image generating section that generates an image based on the image information; and a projecting section that projects the image.

A method for generating an image according to one aspect of the invention includes: allowing an apparatus including an internal clock and a communication section to determine whether or not the setting of the internal clock is normal, determine whether or not a received electronic certificate from a communication target apparatus is valid based on the setting of the internal clock, if determining that the setting of the internal clock is not normal, make the communication section perform communication for authentication irrespective of whether or not the received electronic certificate is valid, if determining that the received electronic certificate is valid, make the communication section perform communication for authentication with the communication target apparatus and receive image information from an image supplying apparatus belonging to a network to which the communication target apparatus belongs or the communication target apparatus, and generate an image based on the image information.

According to the aspects of the invention, the image generating apparatus or the like can appropriately make an authentication determination even if the setting of the internal clock is not normal by performing communication for authentication irrespective of whether or not the received electronic certificate is valid if the image generating apparatus or the like determines that the setting of the internal clock is not normal.

Moreover, according to the aspects of the invention, the image generating apparatus or the like can appropriately make a time-dependent determination and the like by receiving time information from a time information supplying apparatus or the like and updating the setting of the internal clock based on the time information even if the setting of the internal clock is not normal.

Furthermore, according to the aspects of the invention, the image generating apparatus or the like can appropriately determine whether or not the received electronic certificate is valid by determining again whether or not the received electronic certificate is valid in a state in which the setting of the internal clock is updated based on the received time information.

In addition, according to the aspects of the invention, the image generating apparatus or the like can determine more accurately whether or not the received electronic certificate is valid by determining again whether or not the received electronic certificate is valid by the same procedure as a normal authentication procedure.

Moreover, according to the aspects of the invention, the image generating apparatus or the like can increase security in a state in which authentication is not performed.

Furthermore, according to the aspects of the invention, the image generating apparatus or the like can appropriately make an authentication determination even if the setting of the internal clock is not normal because a secondary cell supplying power to the internal clock is out of charge, for example.

In addition, according to the aspects of the invention, since the image generating apparatus or the like ends communication for authentication if determining that communication for authentication using the received electronic certificate received from the communication target apparatus is unsuccessfully performed, the image generating apparatus or the like can increase security.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention which are applied to a projector will be described with reference to the drawings. It should be understood that the embodiments described below are not meant to limit the scope of the invention claimed in the appended claims in any way, and all the configurations described in the embodiments are not always necessary as means for solving the problems of the invention claimed in the appended claims.

First Embodiment

Figure 1:
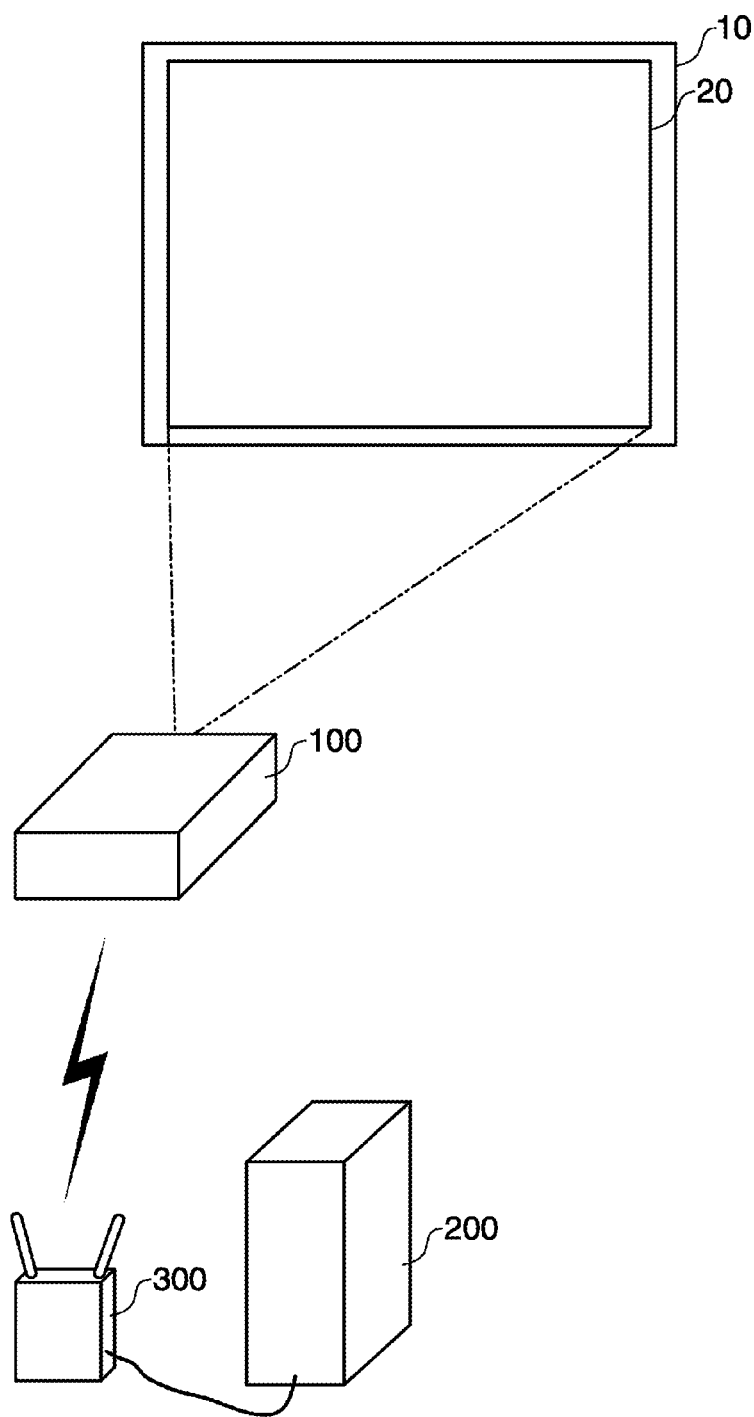
FIG. 1 is a diagram showing a communication status in a first embodiment.

FIG. 1 is a diagram showing a communication status in a first embodiment. A server (a communication target apparatus, an image supplying apparatus, a time information supplying apparatus) 200 and an access point (a communication target apparatus) 300 are connected with a LAN cable. A projector 100 exchanges an electronic certificate with the server 200 via the access point 300 through a wireless LAN, receives image information from the server 200 in an authenticated state, and projects an image 20 onto a screen 10 based on the image information. Incidentally, an example here is a communication status in a company, and there are actually a plurality of access points 300, servers 200, and the like.

The projector 100 has a timepiece function using a secondary cell and uses the timepiece function at the time of authentication. In the case of a company, there are cases where power is not supplied to the secondary cell for a long time due to an interruption of the power supply during the year-end and New Year holidays, for example, and a time or the like becomes imprecise. The projector 100 of this embodiment has the function of connecting to the server 200 by exchanging an electronic certificate and being authenticated also in such a case. Next, a functional block of the projector 100 having such a function will be described.

Figure 2:
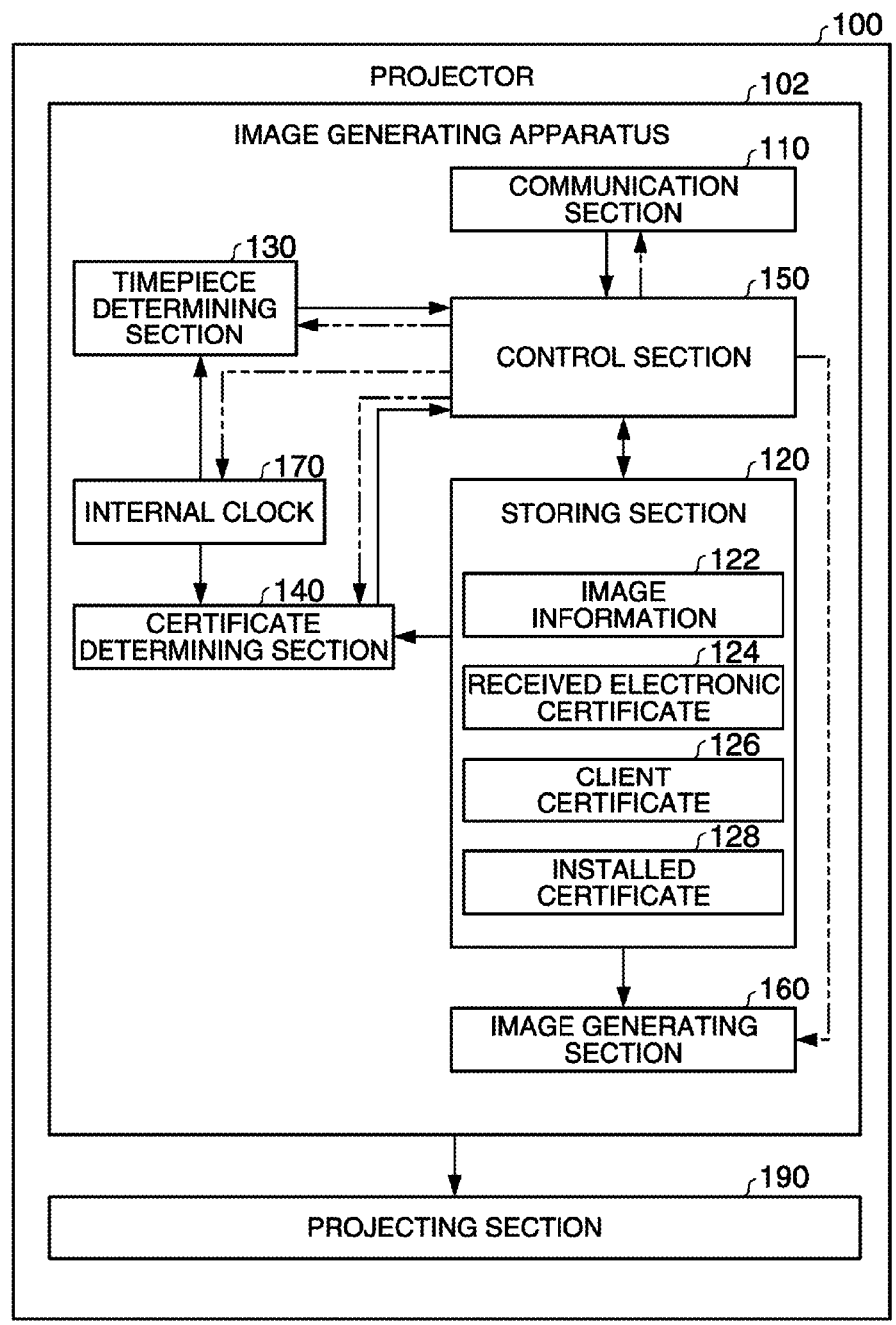
FIG. 2 is a functional block diagram of a projector in the first embodiment.

FIG. 2 is a functional block diagram of the projector 100 in the first embodiment. The projector 100 includes an image generating apparatus 102 generating the image 20 and a projecting section 190. The image generating apparatus 102 includes a communication section 110 having a radio communication function, a storing section 120, a timepiece determining section 130, a certificate determining section 140, a control section 150, an image generating section 160, and an internal clock 170 which is driven by the secondary cell. Moreover, the storing section 120 stores image information 122, a received electronic certificate 124, a client certificate 126, an installed certificate 128, etc.

Figure 3:
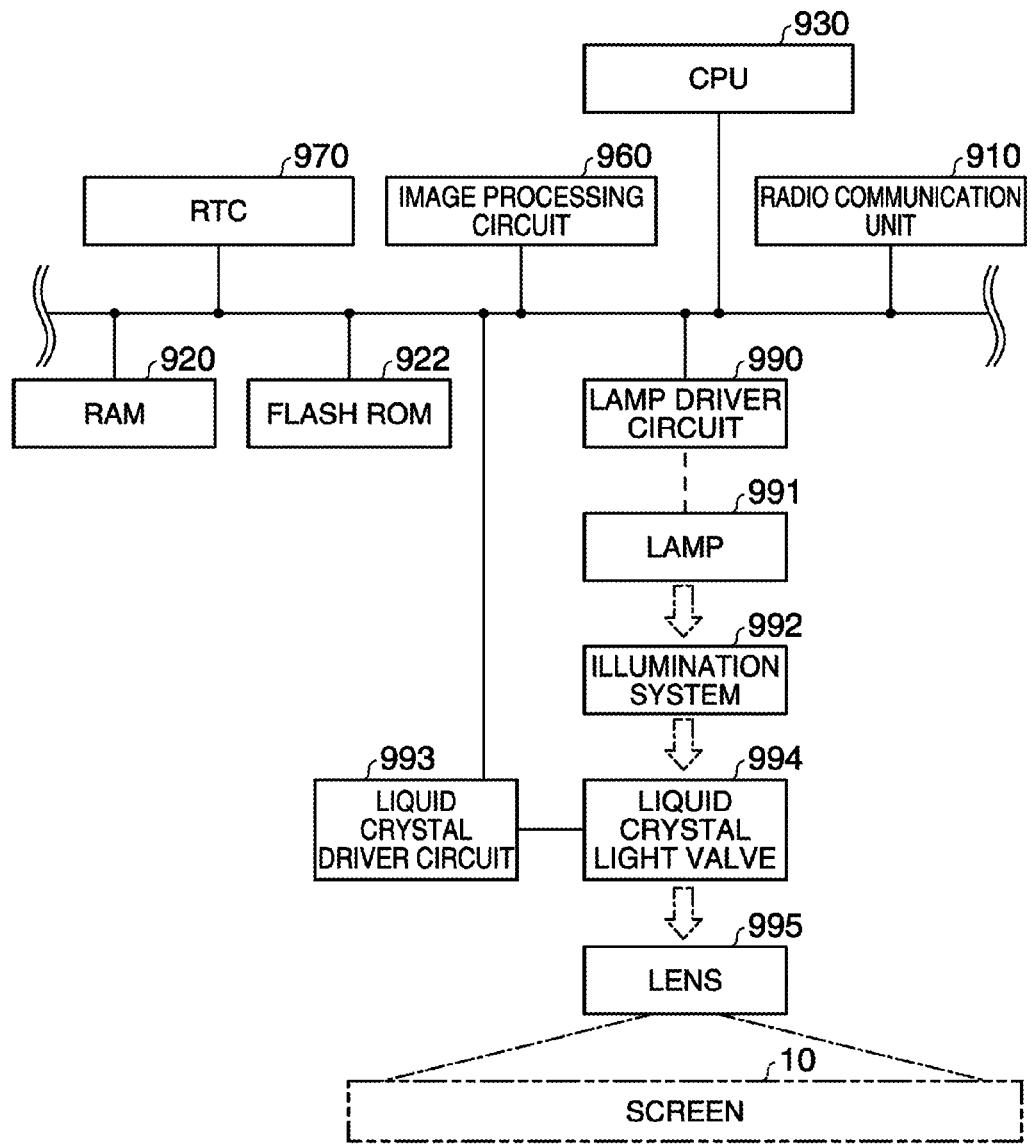
FIG. 3 is a hardware block diagram of the projector in the first embodiment.

Moreover, the projector 100 may function as these sections by using the following hardware. FIG. 3 is a hardware block diagram of the projector 100 in the first embodiment. For example, the radio communication section 110 may be a radio communication unit 910 or the like, the storing section 120 may be a RAM 920, a flash ROM 922, and the like, the timepiece determining section 130, the certificate determining section 140, and the control section 150 may be a CPU 930 or the like, the image generating section 160 may be an image processing circuit 960 or the like, the internal clock 170 may be an RTC (real time clock) 970 or the like, and the projecting section 190 may be a lamp driver circuit 990, a lamp 991, an illumination system 992, a liquid crystal driver circuit 993, a liquid crystal light valve 994, a lens 995, and the like. Incidentally, the lens 995 is actually formed of a plurality of lenses such as a zoom lens, a focus lens, and a projection lens.

Figure 4:
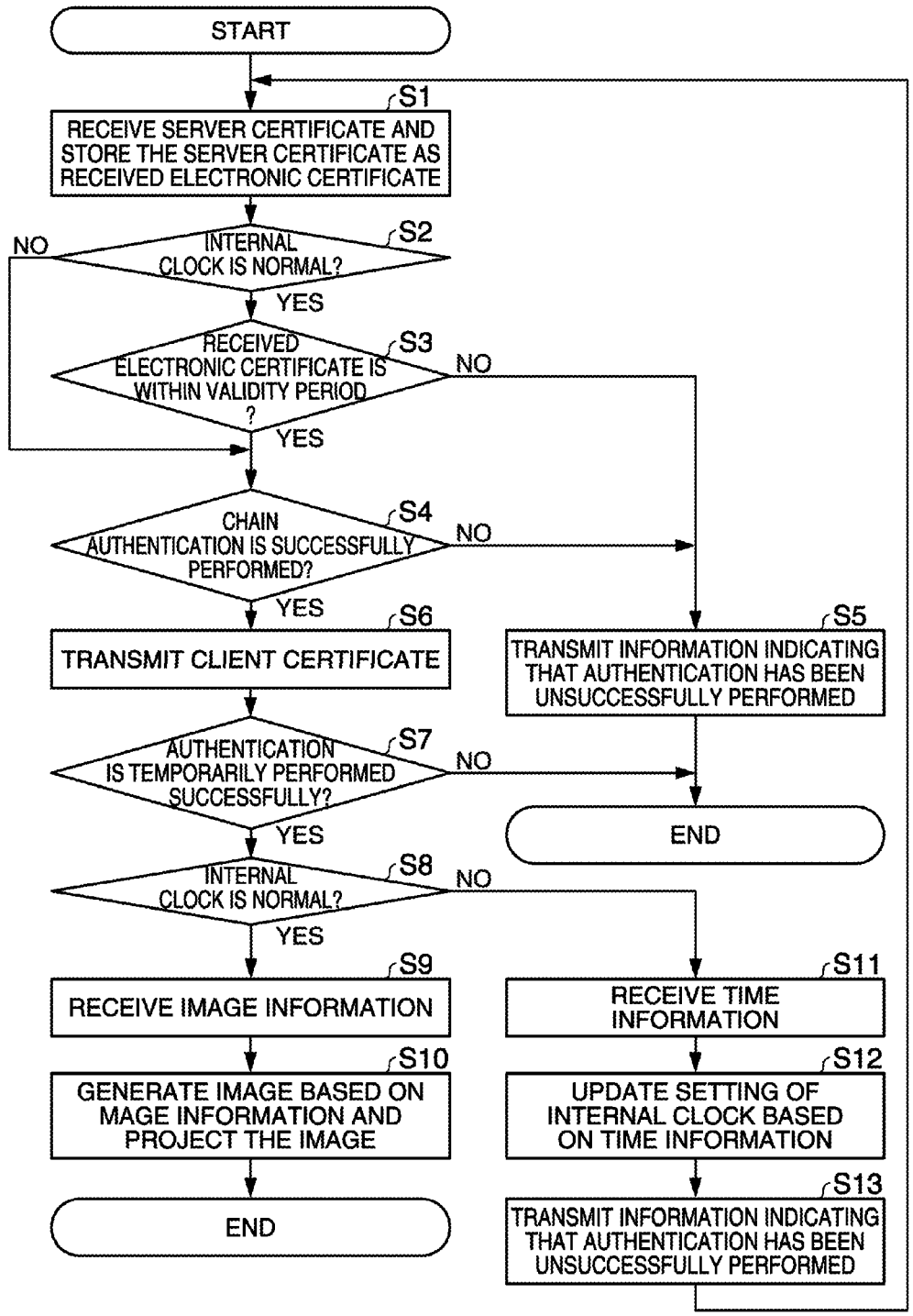
FIG. 4 is a flowchart showing a projection procedure in the first embodiment.

Next, a projection procedure to project the image 20 by using these sections will be described. FIG. 4 is a flowchart showing the projection procedure in the first embodiment. The communication section 110 receives a server certificate from the server 200 via the access point 300, and the control section 150 stores the server certificate in the storing section 120 as a received electronic certificate 124 (step S1).

In response to an instruction from the control section 150, the timepiece determining section 130 determines whether or not the internal clock 170 is normal (step S2). Incidentally, in the internal clock 170, a flag indicating an abnormal state such as a state in which the internal clock 170 is not set or is out of charge is set, and the timepiece determining section 130 can determine whether or not the internal clock 170 is normal by referring to this flag.

If the internal clock 170 is normal, the certificate determining section 140 determines whether or not the received electronic certificate 124 is within a validity period by comparing a date and time indicated by the internal clock 170 with a validity period indicated by the received electronic certificate 124 in response to a validity period determination instruction from the control section 150 (step S3). On the other hand, if the internal clock 170 is not normal, the control section 150 does not issue a validity period determination instruction to the certificate determining section 140, and determination as to whether or not the received electronic certificate 124 is within a validity period is not performed.

If the internal clock 170 is not normal or the received electronic certificate 124 is within a validity period, the certificate determining section 140 determines whether or not chain authentication is successfully performed by determining whether or not a certificate corresponding to the received electronic certificate 124 is in the installed certificate 128 in response to a chain authentication instruction from the control section 150 (step S4). Incidentally, "chain authentication" refers to verifying that an authentication chain from a route certificate to the received server certificate can be confirmed.

If chain authentication is unsuccessfully performed or the received electronic certificate 124 is not within a validity period, the communication section 110 transmits information indicating that authentication has been unsuccessfully performed to the server 200 in response to an instruction from the control section 150 (step S5), and the projector 100 ends the authentication processing. On the other hand, if chain authentication is successfully performed, the communication section 110 transmits a client certificate 126 from the control section 150 to the server 200 (step S6). The server 200 performs authentication processing by using the client certificate 126 and transmits an authentication result to the projector 100.

The control section 150 determines whether or not authentication is temporarily performed successfully based on the information indicating the authentication result received by the communication section 110 (step S7). If authentication is temporarily performed successfully, the control section 150 checks whether or not it has been determined in step S2 that the internal clock 170 is normal (step S8). If it has been determined that the internal clock 170 is normal, the control section 150 makes the communication section 110 receive image information from the server 200 (step S9), stores the image information in the storing section 120 as image information 122, and makes the image generating section 160 generate an image 20 based on the image information 122, and the projecting section 190 projects the image 20 (step S10). Incidentally, if authentication is unsuccessfully performed, the projector 100 ends the authentication processing. Moreover, in step S8, the control section 150 checks whether or not it has been determined in step S2 that the internal clock 170 is normal; however, the same processing as that in step S2 (the processing performed by the timepiece determining section 130 to determine whether or not the internal clock 170 is normal in response to an instruction from the control section 150) may be simply performed again.

On the other hand, if authentication is temporarily performed successfully, if it has been determined in step S2 that the internal clock 170 is not normal, the control section 150 makes the communication section 110 receive time information indicating the current date and time from the server 200 (step S11), and makes the internal clock 170 update the setting so as to indicate the current date and time based on the time information (step S12). Moreover, in this case, the communication section 110 transmits information indicating that authentication has been unsuccessfully performed to the server 200 in response to an instruction from the control section 150 (step S13), and the projector 100 performs the authentication processing from step S1 again. In the second authentication processing, it is determined that the internal clock 170 is normal because the current date and time has been set in the internal clock 170, and validity period determination of the received electronic certificate 124 in step S3 is performed. Incidentally, if it has been determined in step S2 that the internal clock 170 is not normal, the projector 100 cannot receive image information after the first authentication, but can receive time information indicating the current date and time from the server 200. Therefore, even if the internal clock 170 is not normal, the projector 100 can make the internal clock 170 update the setting so as to indicate the current date and time based on the time information.

As described above, according to this embodiment, the projector 100 can appropriately make an authentication determination even if the setting of the internal clock 170 is not normal by performing communication for authentication irrespective of whether or not the received electronic certificate 124 is valid when the projector 100 determines that the setting of the internal clock 170 is not normal. Moreover, according to this embodiment, even if the setting of the internal clock 170 is not normal, the projector 100 receives time information from the server 200, updates the setting of the internal clock 170 based on the time information, and performs validity determination of the received electronic certificate 124 again, whereby the projector 100 can appropriately perform validity determination of the received electronic certificate 124, for example, based on a time. As a result, even if the secondary cell supplying power to the internal clock 170 is out of charge, for example, due to long holidays or the like, the projector 100 can prevent the occurrence of unsuccessful authentication and increase user convenience.

Second Embodiment

If the timepiece determining section 130 determines that the setting of the internal clock 170 is not normal, the control section may perform control to prohibit the communication section 110 from performing communication with an apparatus other than the access point 300 which is a communication target apparatus.

Figure 5:
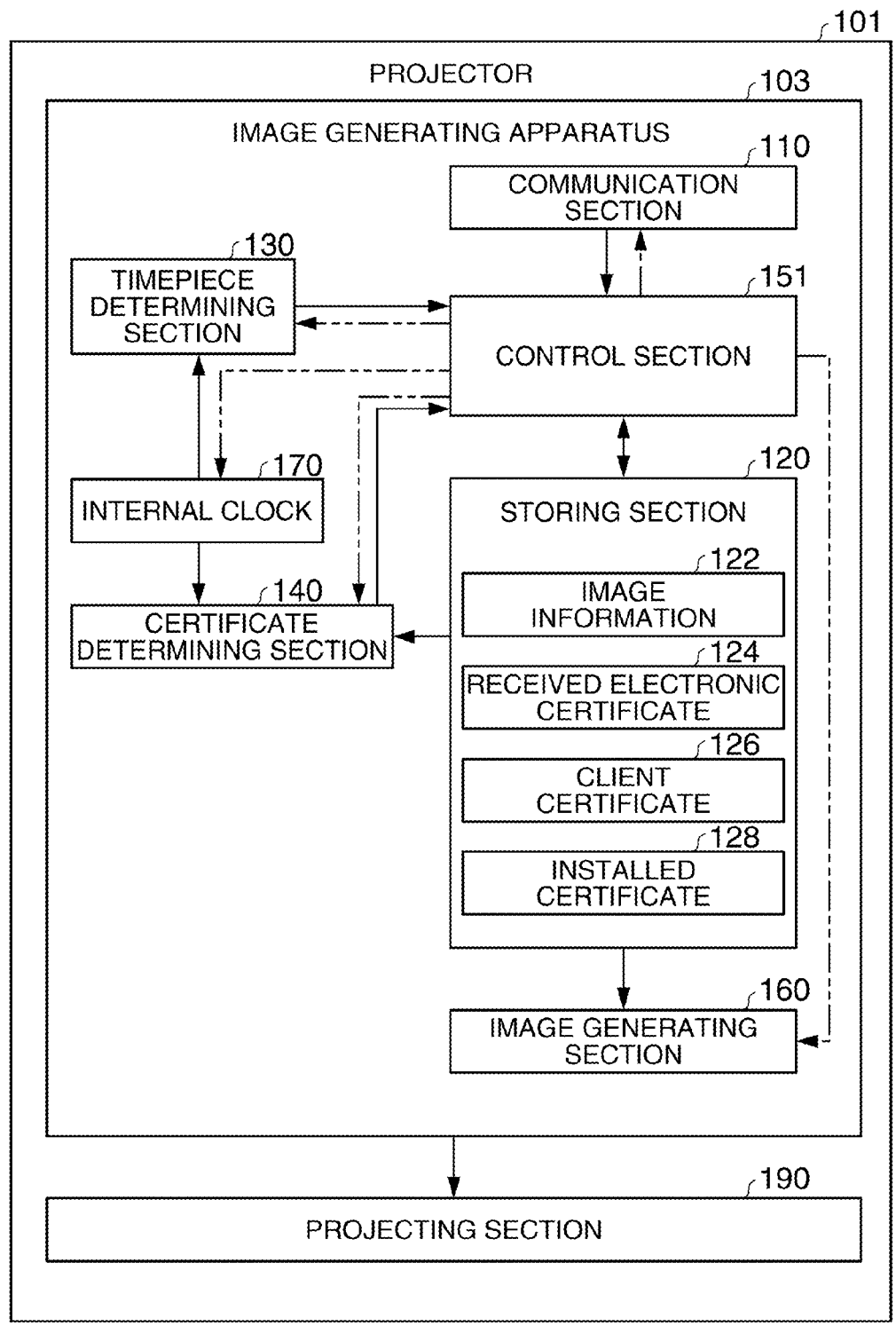
FIG. 5 is a functional block diagram of a projector in a second embodiment.

FIG. 5 is a functional block diagram of a projector 101 in a second embodiment. An image generating apparatus 103 included in the projector 101 includes a control section 151 that performs control to prohibit communication. Incidentally, such a function can be realized by the setting etc. of an authorized port or rejected port by a firewall, for example.

According to this embodiment, the projector 101 can obtain the same effects as those of the first embodiment and increase security in a state in which authentication is not performed.

Other Embodiments

It is to be understood that application of the invention is not limited to the embodiments described above, and modifications are possible. For example, the configurations of the embodiments described above may be combined. Moreover, the server 200 has the function as an image supplying apparatus, the function as a time information supplying apparatus, and the function as an authentication apparatus; however, these functions may be implemented in separate apparatuses. Furthermore, the communication target apparatus is not limited to the access point 300, and an apparatus that can perform communication, the apparatus other than the access point 300, is also applicable. In addition, the communication method is not limited to radio communication, and wire communication may be used. Moreover, the authentication method is not limited to the authentication method of the embodiments described above. For example, an authentication method etc. by which a user name and a password are transmitted in place of a client certificate 126 may be adopted.

Furthermore, in the embodiments described above, the projectors 100 and 101 receive a server certificate again after transmitting, in step S13, information indicating that authentication has been unsuccessfully performed. However, the projectors 100 and 101 may perform a validity period determination etc. by using an existing received electronic certificate 124 without receiving a server certificate again.

Moreover, apparatuses in which the image generating apparatuses 102 and 103 are implemented are not limited to the projectors 100 and 101 and may be, for example, printers, network conference apparatuses, and PCs. Furthermore, in the embodiments described above, the server 200 has the functions of a communication target apparatus, an image supplying apparatus, and a time information supplying apparatus; however, these functions may be implemented in separate apparatuses. For example, the image supplying apparatus is not limited to the server 200 and may be an apparatus other than the server 200, the apparatus such as a NAS (network attached storage). In addition, the time information supplying apparatus may be a dedicated NTP (network time protocol) server, for example. Moreover, the communication target apparatus performing authentication may be a dedicated RADIUS (Remote Authentication Dial In User Service) server, for example.

Furthermore, the computers of the projectors 100 and 101 may function as the control sections 150, 151, or the like by reading a program product stored in an information storage medium. As such an information storage medium, a CD-ROM, a DVD-ROM, a ROM, a RAM, and an HDD, for example, may be used.

In addition, the projectors 100 and 101 are not limited to liquid crystal projectors (transmissive liquid crystal projectors and reflective liquid crystal projectors such as LCOS) and may be, for example, projectors using a digital micromirror device. Moreover, the projecting section 190 may adopt, in place of a lamp, an organic EL device, a silicon light-emitting device, and a self light-emitting device including a solid light source such as a laser diode or an LED (light emitting diode). In addition, the functions of the projectors 100 and 101 may be distributed among a plurality of devices (for example, a PC and a projector). Moreover, the power supply for supplying drive power to the internal clock 170 is not limited to a secondary cell (a so-called rechargeable battery) and may be various types of primary battery, capacitors, and the like.

What is claimed is:

1. An image generating apparatus comprising:
   a timepiece determining section that determines whether or not the setting of an internal clock is normal;
   a certificate determining section that determines, when the timepiece determining section determines that the setting of the internal clock is normal, whether or not a received electronic certificate from a communication target apparatus is valid based on the setting of the internal clock;
   a communication section that performs communication for authentication with the communication target apparatus when the certificate determining section determines that the received electronic certificate is valid, and receives image information from an image supplying apparatus belonging to a network to which the communication target apparatus belongs or the communication target apparatus;
   a control section that
   instructs the communication section to perform communication for temporary authentication with the communication target apparatus, without updating the setting of the internal clock and determining whether the received electronic certificate is valid prior to performing the communication for temporary authentication, when the timepiece determining section determines that the setting of the internal clock is not normal, and
   instructs the communication section to receive time information from a time information supplying apparatus belonging to a network to which the communication target apparatus belongs or the communication target apparatus, and update the setting of the internal clock based on the time information when the timepiece determining section determines that the setting of the internal clock is not normal and the control section determines that the temporary authentication is performed successfully; and
   an image generating section that generates an image based on the image information.

2. The image generating apparatus according to claim 1, wherein after updating the setting of the internal clock, the control section instructs the certificate determining section to determine again whether or not the received electronic certificate is valid.

3. The image generating apparatus according to claim 2, wherein after updating the setting of the internal clock, the control section instructs the communication section to receive the received electronic certificate again before the certificate determining section determines again whether or not the received electronic certificate is valid.

4. The image generating apparatus according to claim 1, wherein if the timepiece determining section determines that the setting of the internal clock is not normal, the control section performs control to prohibit the communication section from performing communication with an apparatus other than the communication target apparatus.

5. The image generating apparatus according to claim 1, wherein
   the internal clock is a timepiece which is driven by a secondary cell.

6. The image generating apparatus according to claim 1, wherein
   if the control section determines that communication for authentication with the communication target apparatus based on the received electronic certificate is unsuccessfully performed, the control section ends the communication for authentication by making the communication section transmit, to the communication target apparatus, information indicating that authentication has been unsuccessfully performed.

7. A projector comprising:
   a timepiece determining section that determines whether or not the setting of an internal clock is normal;
   a certificate determining section that determines, when the timepiece determining section determines that the setting of the internal clock is normal, whether or not a received electronic certificate from a communication target apparatus is valid based on the setting of the internal clock;
   a communication section that performs communication for authentication with the communication target apparatus when the certificate determining section determines that the received electronic certificate is valid, and receives image information from an image supplying apparatus belonging to a network to which the communication target apparatus belongs or the communication target apparatus;
   a control section that
   instructs the communication section to perform communication for temporary authentication with the communication target apparatus, without updating the setting of the internal clock and determining whether the received electronic certificate is valid prior to performing the communication for temporary authentication, when the timepiece determining section determines that the setting of the internal clock is not normal, and
   instructs the communication section to receive time information from a time information supplying apparatus belonging to a network to which the communication target apparatus belongs or the communication target apparatus, and update the setting of the internal clock based on the time information when the timepiece determining section determines that the setting of the internal clock is not normal and the control section determines that the temporary authentication is performed successfully;

an image generating section that generates an image based on the image information; and a projecting section that projects the image.

8. The projector according to claim 7, wherein after updating the setting of the internal clock, the control section instructs the certificate determining section to determine again whether or not the received electronic certificate is valid.

9. The projector according to claim 8, wherein after updating the setting of the internal clock, the control section instructs the communication section to receive the received electronic certificate again before the certificate determining section determines again whether or not the received electronic certificate is valid.

10. The projector according to claim 7, wherein if the timepiece determining section determines that the setting of the internal clock is not normal, the control section performs control to prohibit the communication section from performing communication with an apparatus other than the communication target apparatus.

11. The projector according to claim 7, wherein the internal clock is a timepiece which is driven by a secondary cell.

12. The projector according to claim 7, wherein if the control section determines that communication for authentication with the communication target apparatus based on the received electronic certificate is unsuccessfully performed, the control section ends the communication for authentication by making the communication section transmit, to the communication target apparatus, information indicating that authentication has been unsuccessfully performed.

13. A method for generating an image comprising:

allowing an apparatus including an internal clock and a communication section to determine whether or not the setting of the internal clock is normal, determine, when the setting of the internal clock is determined to be normal, whether or not a received electronic certificate from a communication target apparatus is valid based on the setting of the internal clock, when the setting of the internal clock is not normal, perform, by the communication section, communication for temporary authentication with the communication target apparatus, without updating the setting of the internal clock and determining whether the received electronic certificate is valid prior to performing communication for temporary authentication, when the setting of the internal clock is not normal and the temporary authentication has been performed successfully, receive, by the communication section, time information from a time information supplying apparatus belonging to a network to which the communication target apparatus belongs or the communication target apparatus, and update the setting of the internal clock based on the time information, when the received electronic certificate is valid, perform, by the communication section, communication for authentication with the communication target apparatus and receive image information from an image supplying apparatus belonging to a network to which the communication target apparatus belongs or the communication target apparatus, and generate an image based on the image information.

14. The method for generating an image according to claim 13, wherein the apparatus determines again whether or not the received electronic certificate is valid after updating the setting of the internal clock.

15. The method for generating an image according to claim 13, wherein after the setting of the internal clock is updated, a control section instructs the communication section to receive the received electronic certificate again before a certificate determining section determines again whether or not the received electronic certificate is valid.

16. The method for generating an image according to claim 13, wherein if the apparatus determines that the setting of the internal clock is not normal, the apparatus prohibits the communication section from performing communication with an apparatus other than the communication target apparatus.

17. The method for generating an image according to claim 13, wherein if the apparatus determines that communication for authentication with the communication target apparatus based on the received electronic certificate is unsuccessfully performed, the apparatus instructs the communication section to transmit, to the communication target apparatus, information indicating that authentication has been unsuccessfully performed and ends the communication for authentication.

* * * * *